(12) United States Patent
Chen (10) Patent No.: US 7,537,093 B2
(45) Date of Patent: May 26, 2009

(54) BRAKE DEVICE FOR PUSHCART

(75) Inventor: Shun-Min Chen, Taipei (TW)

(73) Assignee: Wonderland Nurserygoods Co., Ltd., Taipei (TW)

( * ) Notice: Subject to any disclaimer, the term of this patent is extended or adjusted under 35 U.S.C. 154(b) by 854 days.

(21) Appl. No.: 11/223,279

(22) Filed: Sep. 8, 2005

(65) Prior Publication Data

US 2007/0051565 A1    Mar. 8, 2007

(51) Int. Cl.
*B62B 9/08* (2006.01)
(52) U.S. Cl. ............................. 188/20; 188/2 F; 188/31
(58) Field of Classification Search ................. 188/19, 188/20, 30, 31, 2 D, 2 F, 67, 68, 24.16, 24.18, 188/24.22; 280/642, 242.1, 250.1
See application file for complete search history.

(56) References Cited

U.S. PATENT DOCUMENTS

| | | | |
|---|---|---|---|
| 482,708 A * | 9/1892 | Watkins | 188/20 |
| 6,170,615 B1 * | 1/2001 | Cheng | 188/20 |
| 6,264,007 B1 | 7/2001 | Norton et al. | 188/2 |
| 6,341,672 B1 * | 1/2002 | Yang et al. | 188/20 |

OTHER PUBLICATIONS

GB Combined Search and Examination Report dated Dec. 1, 2005, re GB 0519736.3.

* cited by examiner

*Primary Examiner*—Xuan Lan Nguyen
(74) *Attorney, Agent, or Firm*—DLA Piper LLP (US)

(57) ABSTRACT

A brake device for a pushcart includes a rotary lever rotatable on a base between first and second positions and biased to the first position. A cam member is rotatable within the rotary lever, and has a convex portion and a concave portion. A braking pin is disposed movably on the base, and is biased to contact the cam member. When the rotary lever is rotated from the first position to the second position, the cam member rotates so as to move an end of the braking pin from one of the concave portion and the convex portion onto the other one of the concave portion and the convex portion, thereby switching the braking pin between a braking position and a release position.

11 Claims, 7 Drawing Sheets

FIG. 9

BRAKE DEVICE FOR PUSHCART

BACKGROUND OF THE INVENTION

1. Field of the Invention

This invention relates to a brake device, and more particularly to a brake device incorporated in a pushcart for carrying a baby.

2. Description of the Related Art

A pushcart is designed to carry a baby. Typically, a brake device is disposed on such a pushcart, and has a rotary lever that can be pivoted downwardly to lock a wheel. However, to release the wheel, it is necessary to push the rotary lever upwardly, thereby resulting in inconvenience of use.

SUMMARY OF THE INVENTION

An object of this invention is to provide a brake device for a pushcart, which includes a rotary lever that can be operated easily and conveniently to lock and release a wheel.

Another object of this invention is to provide a brake device for a pushcart that includes a rotary lever, which can be stepped on to lock two wheels simultaneously.

According to this invention, a brake device for a pushcart includes a rotary lever rotatable on a base between first and second positions and biased to the first position. A cam member is rotatable within the rotary lever, and has a convex portion and a concave portion. A braking pin is disposed movably on the base, and is biased to contact the cam member. When the rotary lever is rotated from the first position to the second position, the cam member rotates by a predetermined angle so as to move an end of the braking pin from one of the concave portion and the convex portion onto the other one of the concave portion and the convex portion, thereby switching the braking pin between a braking position and a release position. As such, the rotary lever can be designed so as to rotate from the first position to the second position upon application of a downward force thereto, thereby resulting in convenience of use.

BRIEF DESCRIPTION OF THE DRAWINGS

These and other features and advantages of this invention will become apparent in the following detailed description of the preferred embodiments of this invention, with reference to the accompanying drawings, in which.

DETAILED DESCRIPTION OF THE PREFERRED EMBODIMENTS

Figure 1:
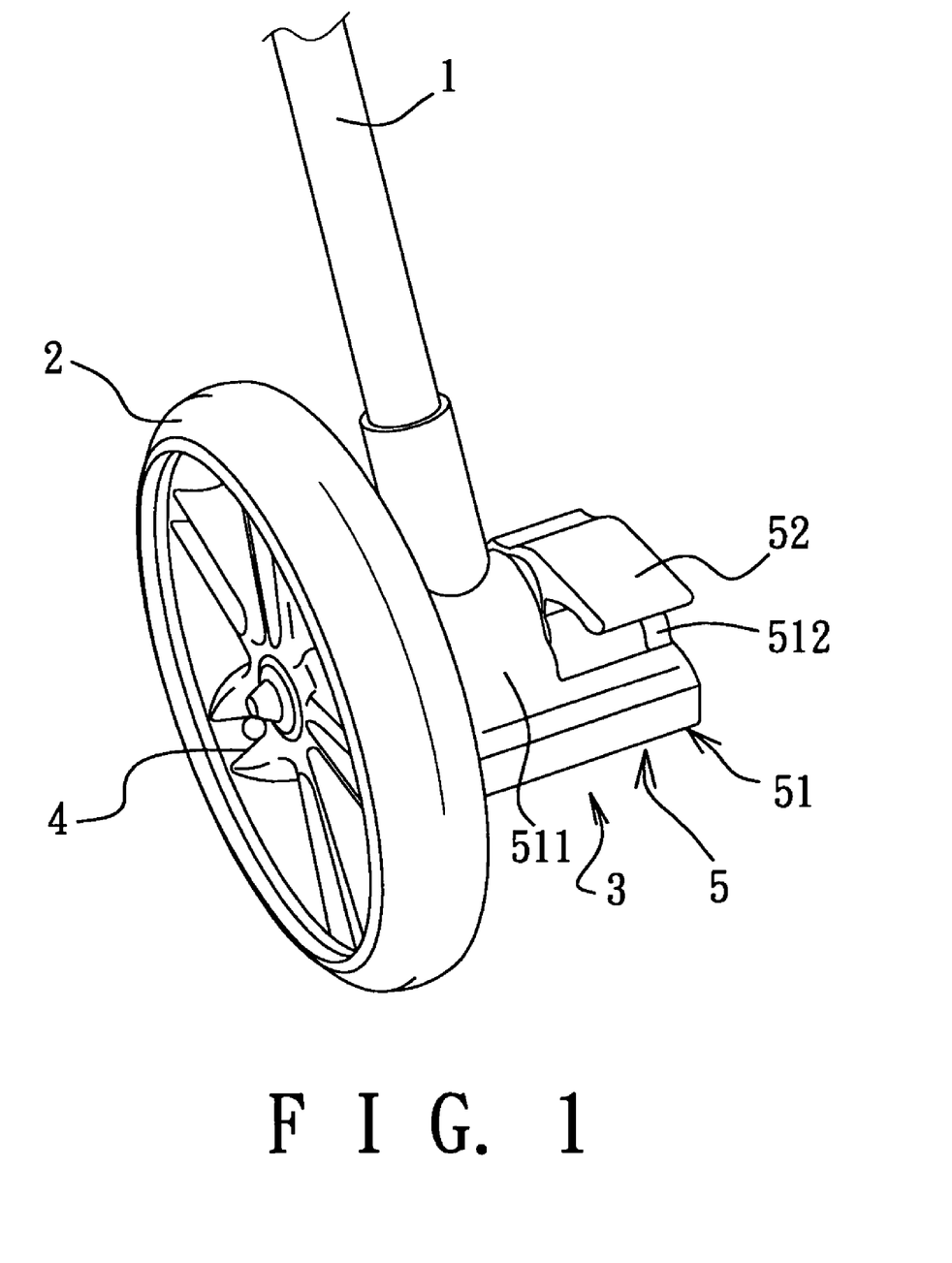
FIG. 1 is an assembled perspective view of the first preferred embodiment of a brake device for a pushcart according to this invention.
Figure 2:
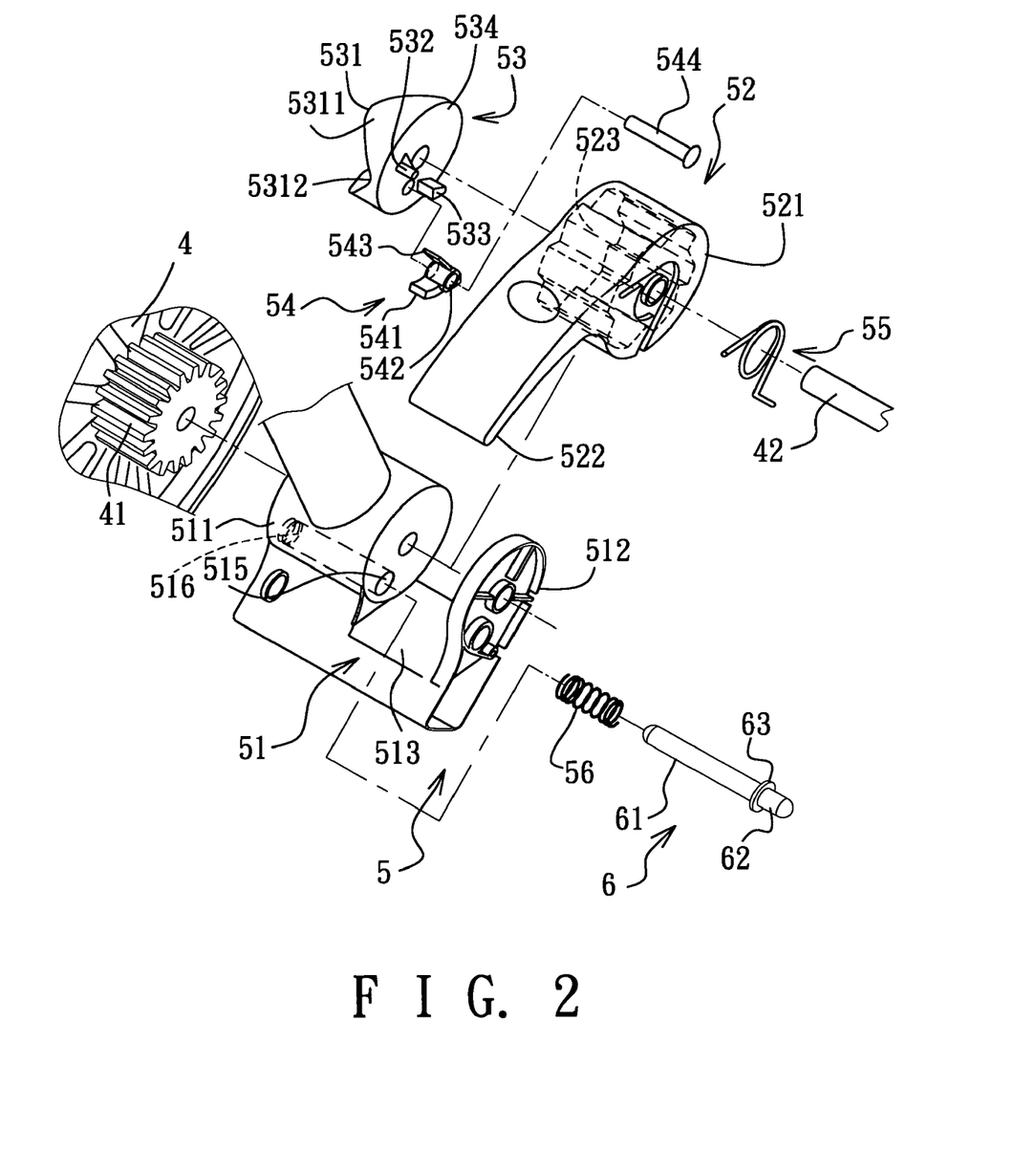
FIG. 2 is an exploded perspective view of the first preferred embodiment.

Referring to FIGS. 1 and 2, the preferred embodiment of a brake device 3 according to this invention is disposed on a pushcart. The pushcart has a cart frame 1 and a plurality of wheels 2 (only one is shown) disposed rotatably on the cart frame 1. The brake device 3 has a main braking mechanism including a pin-engaging member 4, a braking pin 6, and a driving unit 5. The pin-engaging member 4 is connected fixedly to the corresponding wheel 2, and has a plurality of angularly equidistant grooves 41. The braking pin 6 is driven by the driving unit 5 to move toward and away from the grooves 41 in the pin-engaging member 4. When the braking pin 6 engages any of the grooves 41 in the pin-engaging member 4, rotation of the corresponding wheel 2 is prevented.

The braking pin 6 has a pin body 61, a cam-engaging end 62, and an outward flange 63 extending radially and outwardly from a junction between the pin body 61 and the cam-engaging end 62. The driving unit 5 can move the braking pin 6 between a braking position shown in FIG. 7 and a release position shown in FIG. 8. In the braking position, the braking pin 6 engages one of the grooves 41 in the pin-engaging member 4 so as to prevent rotation of the corresponding wheel 2. In the release position, the braking pin 6 is removed from the grooves 41 in the pin-engaging member 4 so as to allow for rotation of the corresponding wheel 2.

Figure 7:
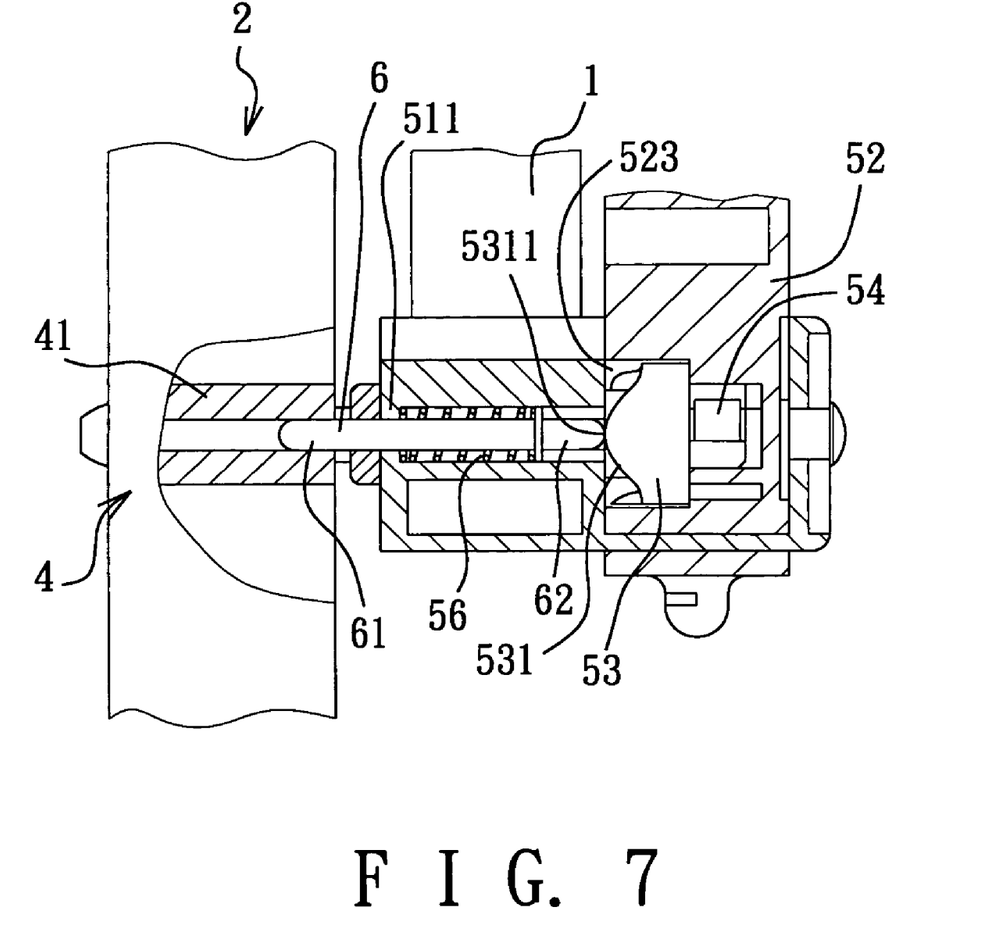
FIG. 7 is a fragmentary sectional view of the first preferred embodiment, illustrating a braking position of a braking pin.
Figure 8:
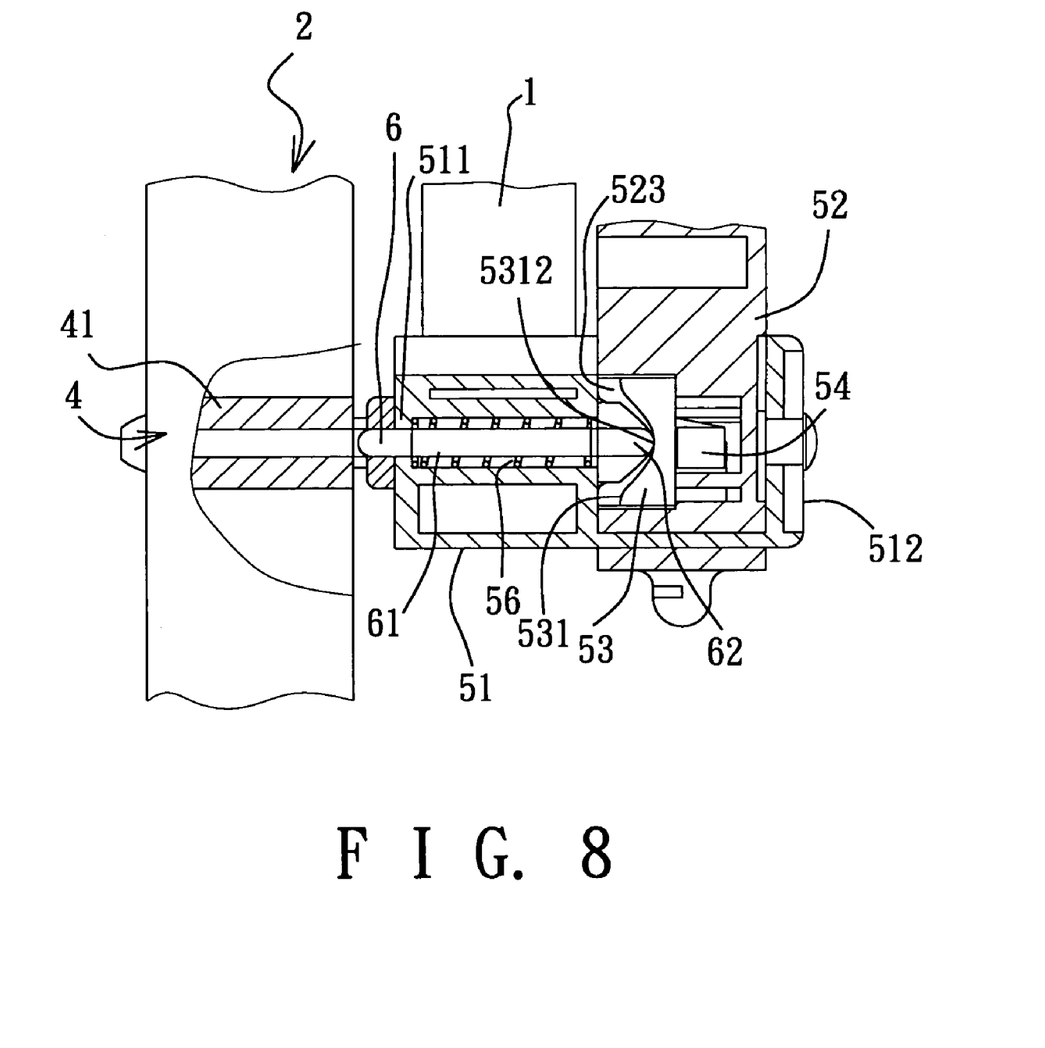
FIG. 8 is a fragmentary sectional view of the first preferred embodiment, illustrating a release position of the braking pin.

The driving unit 5 includes a base 51, a rotary lever 52, a cam member 53 and a flexible and resilient pawl member 54. The base 51 is disposed fixedly on the cart frame 1, and has a proximate end 511 proximate to the pin-engaging member 4, and a distal end 512 distal from the pin-engaging member 4. A lever-accommodating space 513 is formed in the base 51 between the proximate end 511 and the distal end 512. The rotary lever 52 is disposed pivotally within the lever-accommodating space 513. A pinhole unit 515 is formed in the base 51. The braking pin 6 is disposed movably within the pinhole unit 515. An inward flange 516 is formed within the pinhole unit 515 at the proximate end 511 of the base 51. A coiled compression spring 56 is sleeved on the braking pin 6 between the inward flange 516 of the base 51 and the outward flange 63 of the braking pin 6, as shown in FIGS. 7 and 8. As such, the braking pin 6 is biased away from the pin-engaging member 4.

Figure 4:
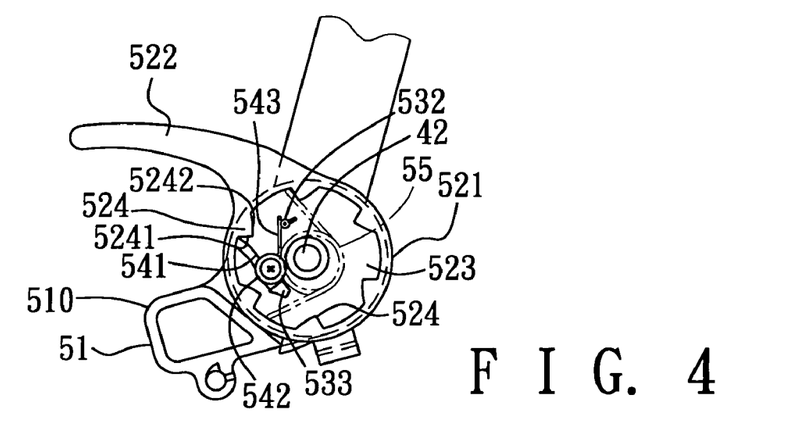
FIG. 4 is a schematic side view of the first preferred embodiment, illustrating a first position of a rotary lever.

With further reference to FIG. 4, the rotary lever 52 includes a hollow shaft body 521 journalled within the lever-accommodating space 513 in the base 51, and a lever portion 522 extending integrally from the shaft body 521 for manual operation to rotate the shaft body 521. The hollow shaft body 521 has a cam-mounting space 523 that is defined by an annular inner surface of the shaft body 521, which is formed with six ratchet teeth 524. Each of the ratchet teeth 524 has a steep slope portion 5241 and a gentle slope portion 5242. The rotary lever 52 is rotatable on the base 51 between a first position shown in FIGS. 4 and 6 and a second position shown in FIG. 5. A torsional spring 55 is disposed between the distal end 512 of the base 51 and the shaft body 521 of the rotary lever 52 for biasing the rotary lever 52 to the first position.

Figure 3:
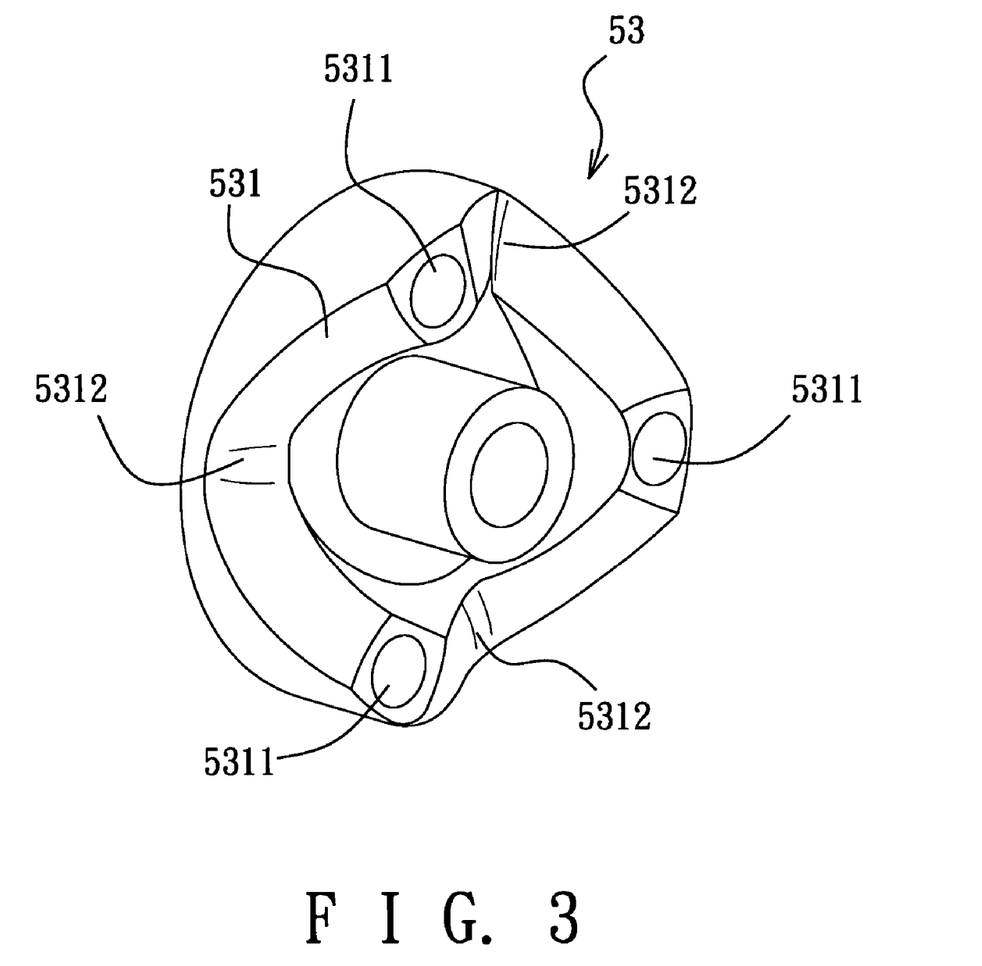
FIG. 3 is a perspective view of a cam member of the first preferred embodiment.

The cam member 53 is disposed within the shaft body 521 of the rotary lever 52, and is formed with an annular cam surface 531. An axle 42 extends through the rotary lever 52, the cam member 53 and the base 51 such that the cam member 53 can rotate within the shaft body 521. With further reference to FIG. 3, the cam surface 531 has three convex portions 5311 and three concave portions 5312, each of the latter of which is disposed between two of the convex portions 5311. The convex portions 5311 are disposed nearer to the pin-engaging member 4 than the concave portions 5312. The coiled compression spring 56 biases the cam-engaging end 62 of the braking pin 6 to contact the cam surface 531. When the braking pin 6 is disposed at the braking position, it engages one of the convex portions 5311, as shown in FIG. 7. When the braking pin 6 is disposed at the release position, it engages one of the concave portions 5312, as shown in FIG. 8. The cam member 53 has first and second projections 532, 533 formed on a planar surface 534 that is opposite to the cam surface 531.

The pawl member 54 is generally V-shaped, and has a first arm 541, a pivot body 542 and a second arm 543. The first and second arms 541, 543 extend integrally from the pivot body 542, and form an angle therebetween. The first arm 541 is thicker than the second arm 543, and has an end biased to press against the steep slope portion 5241 of one of the ratchet teeth 524 of the rotary lever 52. The pivot body 542 is secured to the cam member 53 by a lock pin 544, and abuts against the second projection 533 of the cam member 53. The second arm 543 abuts against the first projection 532 of the cam member 53, and is disposed between the first arm 541 and the first projection 532.

When no force is exerted on the rotary lever 52, the rotary lever 52 is biased by the torsional spring 55 to the first position shown in FIG. 4. In this state, the first arm 541 of the pawl member 54 presses against the steep slope portion 5241 of one of the ratchet teeth 524 of the rotary lever 52.

Figure 5:
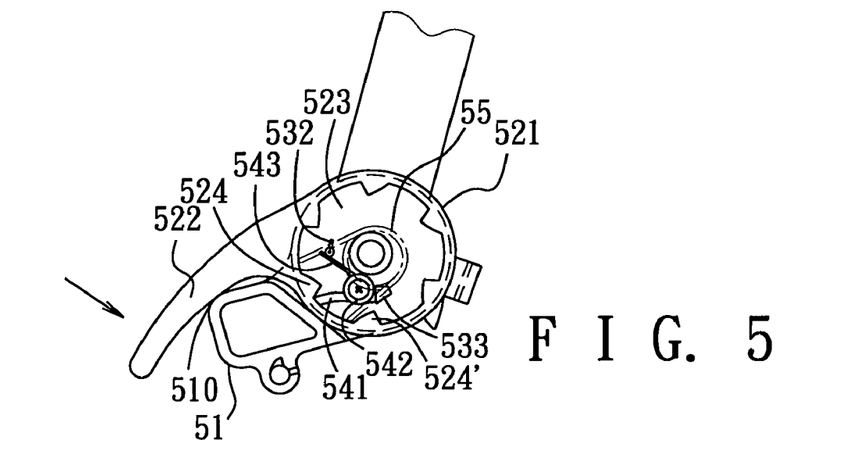
FIG. 5 is a schematic side view of the first preferred embodiment, illustrating a second position of the rotary lever.
Figure 6:
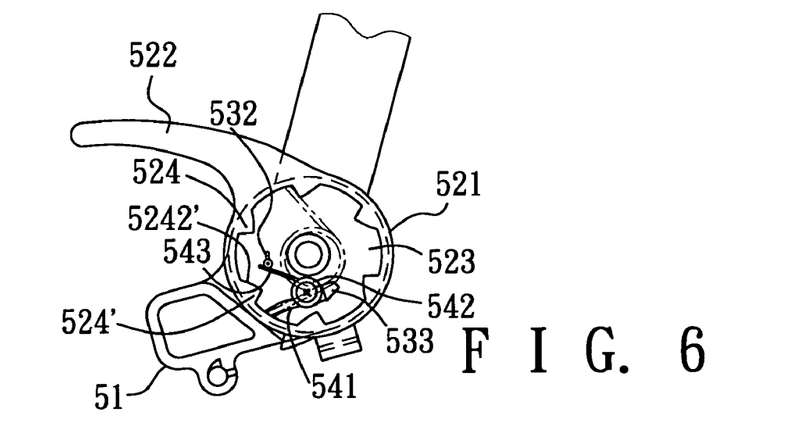
FIG. 6 is a schematic side view of the first preferred embodiment, illustrating how a pawl member is moved past a ratchet tooth of the rotary lever when the rotary lever is released from the second position.

Referring to FIG. 5, when the lever portion 522 of the rotary lever 52 is pressed to pivot the rotary lever 52 from the first position to the second position, because the first arm 541 of the pawl member 54 is pressed against the steep slope portion 5241 of one of the ratchet teeth 524 of the rotary lever 52, the pawl member 54 rotates synchronously with the rotary lever 52. At the same time, because the pawl member 54 is secured to the cam member 53, the cam member 53 also rotates synchronously with the rotary lever 52. When the lever portion 522 of the rotary lever 52 reaches the second position, it contacts a stop portion 510 of the base 51. This prevents further rotation of the lever portion 522 of the rotary lever 52.

Subsequently, when the rotary lever 52 is released, it is biased by the torsional spring 55 to return to the first position. During return of the rotary lever 52 from the second position to the first position, the pivot body 542 of the pawl member 54 and the cam member 53 do not rotate relative to the base 51, and the adjacent ratchet tooth 524 rotates past the first arm 541 of the pawl member 54. In other words, the first arm 541 moves past the adjacent ratchet tooth 524 along the gentle slope portion 5242 of the same. As a result, the cam member 53 and the pawl member 54 rotate in a counterclockwise direction within the shaft body 521 of the rotary lever 52. Because there are six ratchet teeth 524 on the annular inner surface of the shaft body 521, and because there are three convex portions 5311 and three concave portions 5312 on the annular cam surface 531 of the cam member 53, the cam member 53 rotates on the base 51 by an angle of 60 degrees each time the lever portion 522 of the rotary lever 52 is operated. This moves the cam-engaging end 62 of the braking pin 6 from one of the braking position and the release position to the other of the braking position and the release position. That is, rotation of the rotary lever 52 results in switching between the braking position and the release position of the braking pin 6.

Figure 9:
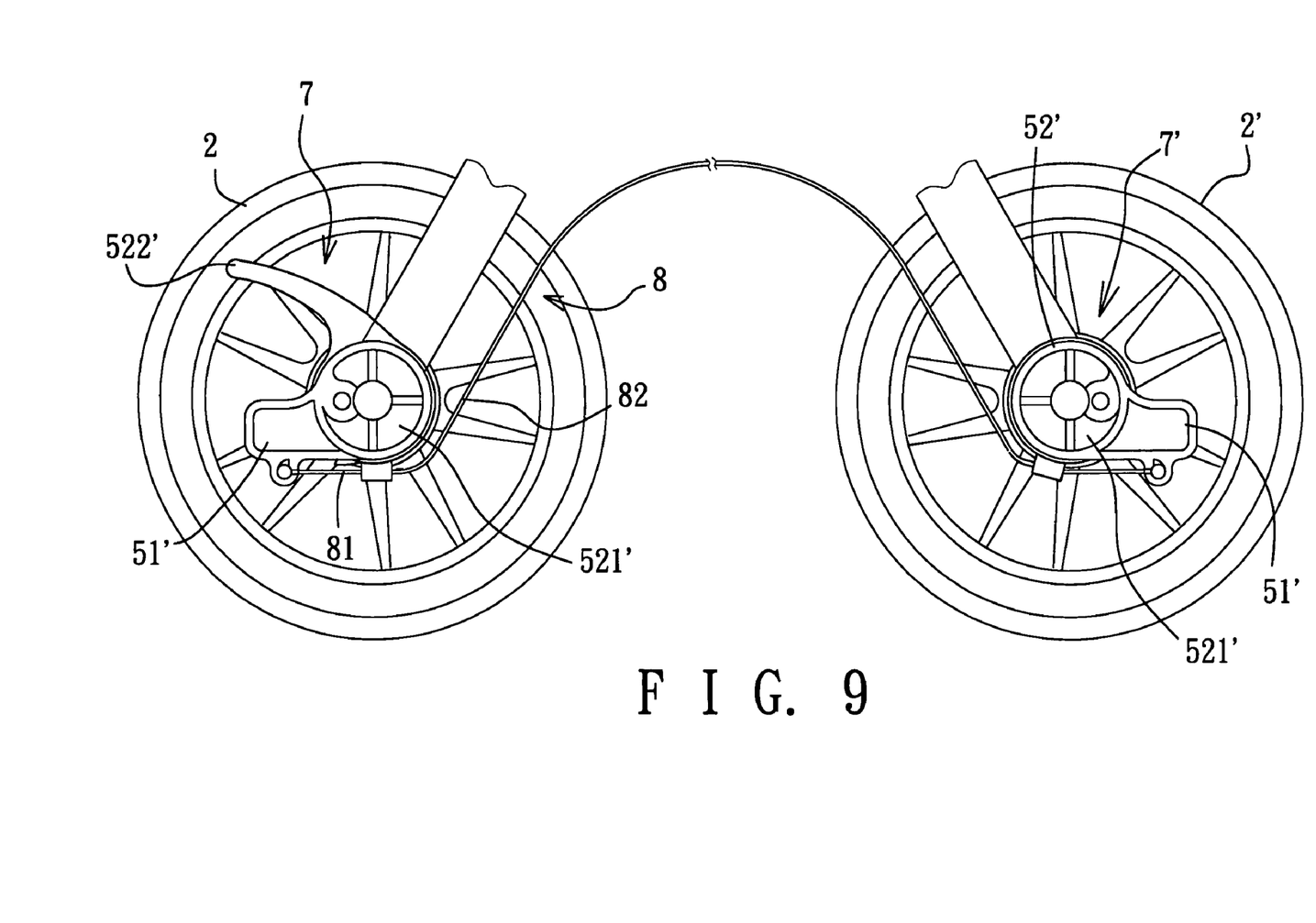
FIG. 9 is a schematic view of the second preferred embodiment of a brake device for a pushcart according to this invention.

Referring to FIG. 9, the second preferred embodiment of a brake device for a pushcart according to this invention includes a main braking mechanism 7, an auxiliary braking mechanism 7', and a connecting device 8. The main and auxiliary braking mechanisms 7, 7' are mounted respectively to a pair of aligned first and second wheels 2, 2'. The structure of the main braking mechanism 7 is the same as that of the first preferred embodiment. The auxiliary braking mechanism 7' is similar in construction to the main braking mechanism 7 except that the lever portion 522' is omitted from the rotary lever 52'. The connecting device 8 includes an inner cable 81 and an outer tube 82. The inner cable 81 has two opposite ends connected respectively and fixedly to the bases 51' of the main and auxiliary braking mechanisms 7, 7'. The outer tube 82 is sleeved movably on the inner cable 81, and has two opposite ends connected respectively and fixedly to the shaft body 521' of the main braking mechanism 7 and the shaft body 521' of the auxiliary braking mechanism 7' so as to allow for synchronous rotation of the lever portion 522' of the main braking mechanism 7 and the shaft body 521' of the auxiliary braking mechanism 7'.

With this invention thus explained, it is apparent that numerous modifications and variations can be made without departing from the scope and spirit of this invention. It is therefore intended that this invention be limited only as indicated by the appended claims.

I claim:

1. A brake device for a pushcart, the pushcart having a cart frame and a first wheel disposed rotatably on the cart frame, said brake device comprising a main braking mechanism that includes:

a pin-engaging member adapted to be connected fixedly to the first wheel and having a plurality of angularly equidistant grooves;

a base adapted to be disposed fixedly on the cart frame;

a rotary lever disposed pivotally on said base and rotatable on said base between first and second positions, said rotary lever being biased to said first position and being operable to rotate from said first position to said second position, said rotary lever including a hollow shaft body that is journalled on said base and that has an annular inner surface;

a cam member disposed rotatably within said shaft body of said rotary lever, said cam member being formed with a cam surface that has a convex portion and a concave portion, said convex portion being disposed nearer to said pin-engaging member than said concave portion; and a braking pin disposed movably on said base and biased to contact said cam surface of said cam member, said braking pin being movable on said base between a braking position, where said braking pin contacts said convex portion of said cam surface of said cam member and where said braking pin engages one of said grooves in said pin-engaging member, and a release position, where said braking pin contacts said concave portion of said cam surface of said cam member and where said braking pin is removed from said grooves in said pin-engaging member, rotation of said rotary lever from said first position to said second position resulting in movement of said braking pin from one of said convex portion and said concave portion of said cam surface of said cam member onto the other one of said convex portion and said concave portion of said cam surface of said cam member.

2. The brake device as claimed in claim 1, wherein said annular inner surface is formed with a plurality of ratchet teeth, said brake device further comprising a pawl member disposed between said cam member and said ratchet teeth of said rotary lever and positioned on said cam member, rotation of said rotary lever from said first position to said second position resulting in rotation of said pawl member and said cam member within said shaft body of said rotary lever.

3. The brake device as claimed in claim 2, wherein each of said ratchet teeth of said shaft body of said rotary lever has a steep slope portion and a gentle slope portion; and said pawl member is flexible and resilient, and has a first arm biased to be in contact with said annular inner surface of said shaft body of said rotary lever, said first arm engaging said steep slope portion of one of said ratchet teeth when said rotary lever is disposed at said first position, rotation of said rotary lever from said first position to said second position resulting in rotation of said cam member relative to said braking pin as a consequence of said pawl member being positioned on said cam member and said first arm of said pawl member engaging said steep slope portion of said one of said ratchet teeth, said first arm of said pawl member moving past an adjacent one of said ratchet teeth when said rotary lever is released from said second position.

4. The brake device as claimed in claim 3, wherein said cam member is formed with a projection, said pawl member being generally V-shaped and further having a pivot body secured to said cam member, and a second arm extending integrally from said pivot body and abutting against said projection of said cam member, said first arm also extending integrally from said pivot body such that an angle is formed between said first and second arms, said second arm being disposed between said first arm and said projection of said cam member.

5. The brake device as claimed in claim 2, the pushcart further having a second wheel disposed rotatably on the cart frame and aligned with the first wheel, further comprising:

an auxiliary braking mechanism including a pin-engaging member adapted to be connected fixedly to the second wheel, a base adapted to be disposed fixedly on the cart frame, a shaft body disposed pivotally on said base of said auxiliary braking mechanism, a cam member disposed rotatably within said rotary lever of said auxiliary braking mechanism, a braking pin disposed movably on said base of said auxiliary braking mechanism and biased to contact said cam member of said auxiliary braking mechanism, said cam member of said auxiliary braking mechanism being rotatable relative to said braking pin of said auxiliary braking mechanism so as to move said braking pin of said auxiliary braking mechanism toward and away from the second wheel; and a connecting device interconnecting said main braking mechanism and said auxiliary braking mechanism so as to allow for synchronous movement of said braking pins of said main and auxiliary braking mechanisms.

6. The brake device as claimed in claim 5, wherein said connecting device includes:

an inner cable having two opposite ends connected respectively and fixedly to said bases of said main and auxiliary braking mechanisms, and an outer tube sleeved movably on said inner cable and having two opposite ends connected respectively and fixedly to said shaft body of said main braking mechanism and said shaft body of said auxiliary braking mechanism so as to allow for synchronous rotation of said rotary lever of said main braking mechanism and said shaft body of said auxiliary braking mechanism.

7. The brake device as claimed in claim 1, further including a torsional spring disposed between said base and said rotary lever for biasing said rotary lever to said first position.

8. The brake device as claimed in claim 1, further comprising a coiled compression spring for biasing said braking pin to contact said cam surface of said cam member.

9. The brake device as claimed in claim 1, wherein said rotary lever further has a lever portion extending integrally from said shaft body and allowing for manual operation to rotate said shaft body.

10. The brake device as claimed in claim 1, the pushcart further having a second wheel disposed rotatably on the cart frame and aligned with the first wheel, further comprising:

an auxiliary braking mechanism including a pin-engaging member adapted to be connected fixedly to the second wheel, a base adapted to be disposed fixedly on the cart frame, a shaft body disposed pivotally on said base of said auxiliary braking mechanism, a cam member disposed rotatably within said rotary lever of said auxiliary braking mechanism, a braking pin disposed movably on said base of said auxiliary braking mechanism and biased to contact said cam member of said auxiliary braking mechanism, said cam member of said auxiliary braking mechanism being rotatable relative to said braking pin of said auxiliary braking mechanism so as to move said braking pin of said auxiliary braking mechanism toward and away from the second wheel; and a connecting device interconnecting said main braking mechanism and said auxiliary braking mechanism so as to allow for synchronous movement of said braking pins of said main and auxiliary braking mechanisms.

11. The brake device as claimed in claim 10, wherein said connecting device includes:

an inner cable having two opposite ends connected respectively and fixedly to said bases of said main and auxiliary braking mechanisms, and an outer tube sleeved movably on said inner cable and having two opposite ends connected respectively and fixedly to said shaft body of said main braking mechanism and said shaft body of said auxiliary braking mechanism so as to allow for synchronous rotation of said rotary lever of said main braking mechanism and said shaft body of said auxiliary braking mechanism.

* * * * *